US012659067B2

(12) United States Patent
Kawai et al.

(10) Patent No.: US 12,659,067 B2
(45) Date of Patent: Jun. 16, 2026

(54) OPTICAL TRANSMISSION SYSTEM, TRANSMITTER, AND CONTROL METHOD

(71) Applicant: NTT, Inc., Tokyo (JP)

(72) Inventors: Akira Kawai, Musashino (JP);
Takayuki Kobayashi, Musashino (JP);
Masanori Nakamura, Musashino (JP);
Shimpei Shimizu, Musashino (JP);
Yutaka Miyamoto, Musashino (JP)

(73) Assignee: NTT, Inc., Tokyo (JP)

( * ) Notice: Subject to any disclaimer, the term of this patent is extended or adjusted under 35 U.S.C. 154(b) by 271 days.

(21) Appl. No.: 18/695,580

(22) PCT Filed: Sep. 29, 2021

(86) PCT No.: PCT/JP2021/035771
§ 371 (c)(1),
(2) Date: Mar. 26, 2024

(87) PCT Pub. No.: WO2023/053244
PCT Pub. Date: Apr. 6, 2023

(65) Prior Publication Data
US 2024/0413922 A1      Dec. 12, 2024

(51) Int. Cl.
*H04J 14/04* (2006.01)
*H04B 10/2581* (2013.01)
*H04B 10/516* (2013.01)

(52) U.S. Cl.
CPC .......... *H04J 14/04* (2013.01); *H04B 10/2581* (2013.01); *H04B 10/516* (2013.01)

(58) Field of Classification Search
None
See application file for complete search history.

(56) References Cited

U.S. PATENT DOCUMENTS 9,444,573 B2 * 9/2016 Nakagawa ........ H04J 14/02216
9,794,020 B2 * 10/2017 Zhou ..................... H04J 14/052
(Continued)

OTHER PUBLICATIONS

Mizuno, T. et al., "Dense space division multiplexed transmission over multicore and multimode fiber for long-haul transport systems", Journal of Lightwave Technology, 2016, 34(6), pp. 1484-1493.

(Continued)

*Primary Examiner* — Jai M Lee
(74) *Attorney, Agent, or Firm* — Harness, Dickey & Pierce, P.L.C.

(57) ABSTRACT

One aspect of the present invention is an optical transmission system including a transmitter connected to a transmission line having M spatial channels, and a receiver that receives a signal transmitted from the transmitter via the transmission line, wherein the transmitter includes: an allocator that allocates a transmission bit string transmitted to the transmission line into a bit string serving as a basic signal and a bit string serving as spatial channel information; a generator that generates N (M>N) signals from the bit string serving as the basic signal allocated by the allocator; and a selector that selects N spatial channels, through which the N signals generated by the generator are transmitted, from the M spatial channels on the basis of the bit string serving as the spatial channel information allocated by the allocator.

18 Claims, 8 Drawing Sheets

1

(56) References Cited

U.S. PATENT DOCUMENTS

| | | | |
|---|---|---|---|
| 11,245,486 B2 * | 2/2022 | Ashrafi | H04L 5/04 |
| 11,516,562 B2 * | 11/2022 | Jinno | H04B 10/2581 |
| 11,936,431 B2 * | 3/2024 | Aono | H04J 14/0298 |
| 2002/0041727 A1 * | 4/2002 | Zami | H04Q 11/0005 |
| | | | 385/16 |
| 2010/0232786 A1 * | 9/2010 | Aoki | H04J 3/1658 |
| | | | 398/19 |
| 2013/0235744 A1 * | 9/2013 | Chen | H04L 25/14 |
| | | | 370/252 |
| 2014/0044137 A1 * | 2/2014 | Miyaji | H04J 3/06 |
| | | | 370/509 |
| 2014/0286637 A1 * | 9/2014 | Kikuchi | H04J 14/0212 |
| | | | 398/48 |
| 2015/0043910 A1 * | 2/2015 | Koebele | H04B 10/25891 |
| | | | 398/44 |
| 2015/0098697 A1 * | 4/2015 | Marom | G02B 6/2848 |
| | | | 398/44 |
| 2016/0197679 A1 * | 7/2016 | Tanaka | H04L 27/2627 |
| | | | 398/79 |
| 2024/0056210 A1 * | 2/2024 | Guo | H01S 3/13013 |

OTHER PUBLICATIONS

Shibahara, K. et al., "Long-haul DMD-unmanaged 6-mode-multiplexed transmission employing cyclic mode-group permutation", OFC 2020, Mar. 2020, Th3H-3.

* cited by examiner

OPTICAL TRANSMISSION SYSTEM, TRANSMITTER, AND CONTROL METHOD

CROSS-REFERENCE TO RELATED APPLICATIONS

This application is a 371 U.S. National Phase of International Application No. PCT/JP2021/035771, filed on Sep. 29, 2021. The entire disclosure of the above application is incorporated herein by reference.

TECHNICAL FIELD

The present invention relates to techniques for an optical transmission system, a transmitter, and a control method.

BACKGROUND ART

With development of information technologies, communication demand continues to expand. Amid this, optical communication using optical fibers is often used for fixed lines which require a large capacity in particular because of wide available frequency bands and low signal attenuation. In order to continue to support the expanding communication demand, communication using optical fibers needs to be continuously increased in capacity.

Currently, an optical fiber called a single mode fiber, which has one spatial propagation mode in an optical fiber, is mainly used for large capacity communication. It is said that the capacity of the single mode fiber is approaching a theoretical limit called a nonlinear Shannon limit. For this reason, a technique called spatial multiplex transmission, which can increase the capacity by using an optical fiber having a plurality of spatial channels, has been attracting attention and extensively studied.

In the spatial multiplex transmission, by modulating independent signals in each spatial channel, it is possible to realize a capacity per optical fiber that exceeds the nonlinear Shannon limit of the single mode fiber.

In order to realize a plurality of spatial propagation modes in one optical fiber, a multicore fiber, a multimode fiber, and a multicore multimode fiber have been proposed. In these optical fibers, realization of a plurality of spatial propagation modes has been demonstrated (see, for example, NPL 1).

Also, a multicore fiber has a plurality of cores (portions in an optical fiber through which light propagates) in one optical fiber. The multimode fiber realizes a plurality of propagation modes in one core. The multicore multimode fiber is a combination of a multicore fiber and a multimode fiber. In the following description, the above-mentioned multicore fiber, multimode fiber, and multicore multimode fiber will be collectively referred to as a spatial multiplex fiber.

In optical transmission using a multimode fiber or a multicore fiber having strong coupling between cores (a coupled core fiber), crosstalk of signals occurs between modes or between cores. When such crosstalk occurs, signals from each channel can be separated and restored by digital signal processing according to a multiple-input and multiple-output (MIMO) system using an adaptive filter technique.

Normally, independent signals are sent to all propagation channels (a mode in the case of a multimode fiber and a core in the case of a coupled core fiber) of each optical fiber, and MIMO digital signal processing is performed also on a receiving side by using signals from all channels (full MIMO).

In the spatial multiplex transmission, particularly when a distance of transmission is a long distance such as a trans-oceanic distance, signal distortion due to noise from an amplifying repeater and a nonlinear optical effect in an optical fiber has a greater impact on transmission, and full MIMO may not enable signals to be received (see, for example, NPL 2).

When a signal cannot be received, two countermeasures are mainly conceivable. One is a countermeasure using a stronger error correction code. The other is a countermeasure using diversity reception in which the same signal is transmitted to a plurality of channels and these signals are combined and received on a receiving side.

In the countermeasure using a correction code, by increasing a coding rate, correction can be performed even if an error rate of a signal increases due to signal distortion. In the countermeasure using diversity reception, by substantially increasing strength of a signal, an error rate of the signal can be reduced. These two countermeasures are techniques used under a low signal to noise ratio (SNR) environment.

CITATION LIST

Non Patent Literature

[NPL 1] Mizuno, T., Takara, H., Shibahara, K., Sano, A., & Miyamoto, Y. (2016) Dense space division multiplexed transmission over multicore and multimode fiber for long-haul transport systems. Journal of Lightwave Technology, 34 (6), 1484-1493.

[NPL 2] Shibahara, K., Mizuno, T., Ono, H., Nakajima, K., & Miyamoto, Y. (2020 March). Long-haul DMD-unmanaged 6-model-multiplexed transmission employing cyclic mode-group permutation. In Optical Fiber Communication Conference (pp. Th3H-3). Optical Society of America.

SUMMARY OF INVENTION

Technical Problem

The countermeasure using a correction code requires a dedicated circuit design corresponding to the correction code when an integrated circuit used for communication is manufactured. In addition, in the countermeasure using diversity reception, an amount of transmittable information decreases in inverse proportion to the number of signals to be transmitted together.

As described above, known techniques for dealing with a low SNR environment have problems such as requiring a dedicated circuit design and reducing an amount of transmittable information.

In view of the foregoing circumstances, an object of the present invention is to provide a technique in which appropriate optical transmission can be realized under a low SNR environment.

Solution to Problem

One aspect of the present invention is an optical transmission system including a transmitter connected to a transmission line having M spatial channels, and a receiver that receives a signal transmitted from the transmitter via the transmission line, wherein the transmitter includes: an allocator that allocates a transmission bit string transmitted to the transmission line into a bit string serving as a basic signal and a bit string serving as spatial channel information; a generator that generates N (M>N) signals from the bit string serving as the basic signal allocated by the allocator; and a selector that selects N spatial channels, through which the N signals generated by the generator are transmitted, from the M spatial channels on the basis of the bit string serving as the spatial channel information allocated by the allocator.

One aspect of the present invention is a transmitter connected to a transmission line having M spatial channels, including: an allocator that allocates a transmission bit string transmitted to the transmission line into a bit string serving as a basic signal and a bit string serving as spatial channel information; a generator that generates N (M>N) signals from the bit string serving as the basic signal allocated by the allocator; and a selector that selects N spatial channels, through which the N signals generated by the generator are transmitted, from the M spatial channels on the basis of the bit string serving as the spatial channel information allocated by the allocator.

One aspect of the present invention is a method for controlling a transmitter connected to a transmission line having M spatial channels, including: allocating a transmission bit string transmitted to the transmission line into a bit string serving as a basic signal and a bit string serving as spatial channel information; generating N (M>N) signals from the bit string serving as the basic signal allocated in the allocating; and selecting N spatial channels, through which the N signals generated in the generating are transmitted, from the M spatial channels on the basis of the bit string serving as the spatial channel information allocated in the allocating.

Advantageous Effects of Invention

According to the present invention, appropriate optical transmission can be realized under a low SNR environment.

DESCRIPTION OF EMBODIMENTS

An embodiment of the present invention will be described in detail with reference to the diagrams.

Figure 1:
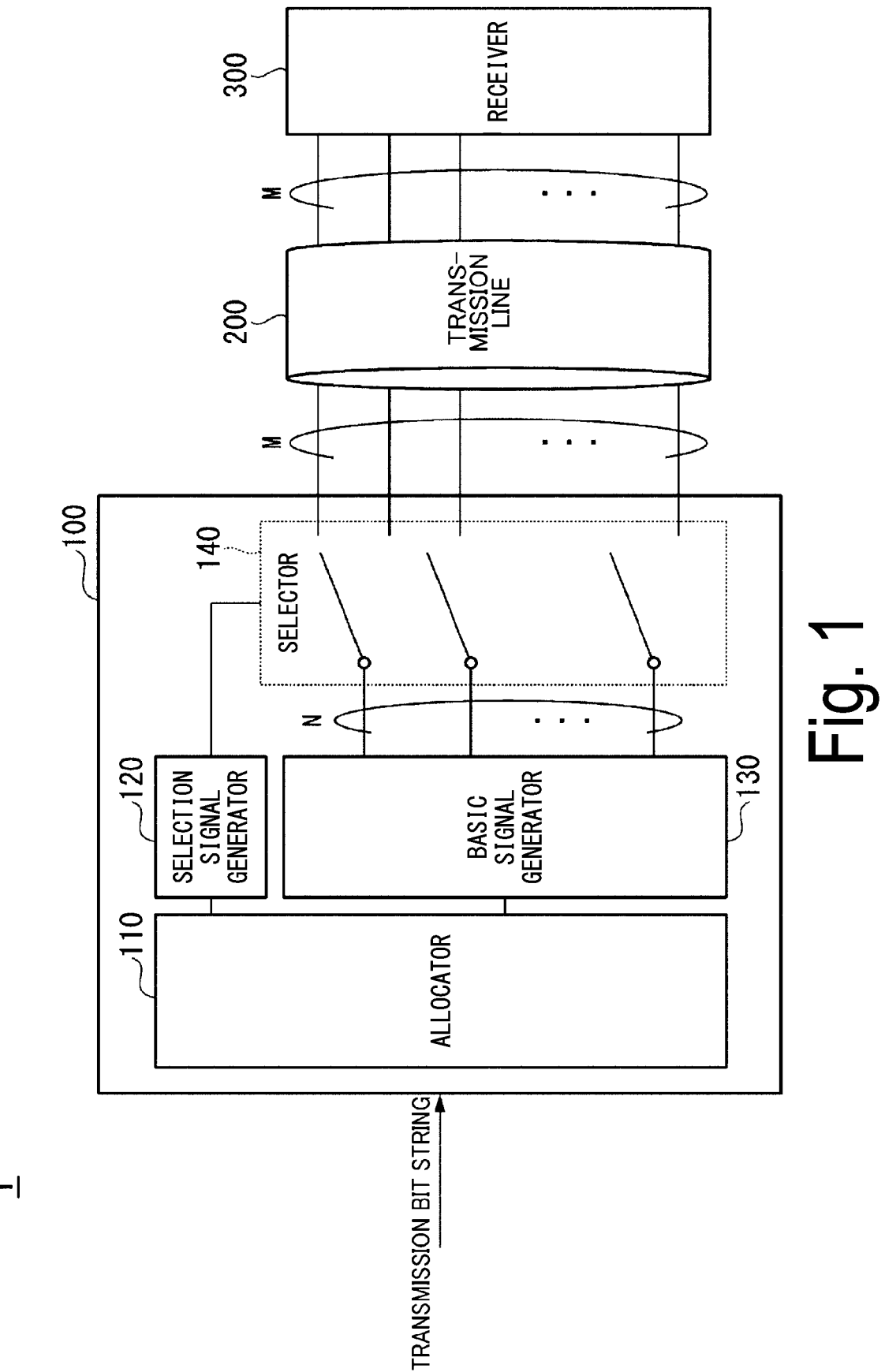
FIG. 1 is a block diagram showing a configuration of an optical transmission system.

FIG. 1 is a block diagram showing a configuration of an optical transmission system 1 according to the embodiment. The optical transmission system 1 includes a transmitter 100, a transmission line 200, and a receiver 300. The transmitter 100 and the receiver 300 are connected to each other via the transmission line 200. The transmission line 200 is a spatial multiplex fiber (a multicore fiber, a multimode fiber, or a multicore multimode fiber). Also, the transmission line 200 has M (M is an integer equal to or greater than 2) spatial channels.

A transmission bit string to be transmitted to the receiver 300 is input to the transmitter 100. The transmitter 100 is configured of an allocator 110, a selection signal generator 120, a basic signal generator 130, and a selector 140. The allocator 110 allocates the transmission bit string to be transmitted to the transmission line 200 into a bit string serving as a basic signal and a bit string serving as space channel information. In the following description, the bit string serving as the basic signal may be represented as a basic bit string, and the bit string serving as the spatial channel information may be represented as a channel bit string.

The allocator 110 outputs the channel bit string to the selection signal generator 120. The allocator 110 outputs the basic bit string to the basic signal generator 130. The selection signal generator 120 generates the channel bit string as a selection signal for driving the selector 140 and outputs it to the selector 140. The basic signal generator 130 generates N (M>N) independent electric or optical signals from the basic bit string and outputs them to the selector 140. Further, a signal generation method performed by the basic signal generator 130 is based on a known technique such as mapping·training signal insertion to symbols such as QAM, waveform shaping, or the like. Also, the basic signal generator 130 is an example of the generator.

The selector 140 selects N spatial channels, through which the N signals generated by the basic signal generator 130 are transmitted, from the M spatial channels on the basis of the channel bit string. The basic signal is transmitted to the receiver 300 through the selected spatial channels in the transmission line 200. In the following description, an "n-th channel" indicates a channel corresponding to the position counted from the top of the M channels shown in FIG. 1. For example, the uppermost channel is the first channel, and the lowermost channel is the M-th channel.

Prior to the description of processing of each portion of the transmitter 100, how information can be transmitted from the transmitter 100 to the receiver will be described using a combination of channels used for transmission. First, when signals are transmitted using the N channels among the M channels, there are $M!/((M-N)! \times N!)$ (expressed as $=C(M, N)$) combinations of channels used for transmission.

When C(M, N) is used, bit strings of $[\log(C(M, N))]$ (expressed as $=K$) can be expressed at the maximum. Here, [a] indicates the largest integer among integers below a. Also, the base of the logarithm is 2. In the following description, unless otherwise specified, the base of the logarithm is 2.

A part of C(M, N) and a value which can be expressed by k bits can be associated with each other in one-to-one correspondence. Accordingly, by associating a combination of channels to be used with each value of k bits between the transmitter 100 and the receiver 300, the receiver 300 can acquire information of k bits from the combination of channels through which signals are received. That is, even if the actual k bits are not transmitted as a signal, the signals of k bits can be transmitted to the receiver 300 using the combination of channels to be used.

For example, since C(3, 2) is 3, there are 3 combinations of using 2 channels among 3 channels. Specifically, there are three combinations including a combination using a first channel and a second channel, a combination using the first channel and a third channel, and a combination using the second channel and the third channel.

In addition, in the case of C(3, 2), k=1. Then, for example, the combination using the first channel and the second channel is associated with "0", and the combination using the first channel and the third channel is associated with "1". By sharing this correspondence between the transmitter 100 and the receiver 300 in advance, "0" or "1" can be transmitted from the transmitter 100 to the receiver using the combination of channels used for transmission.

On the basis of the above, a specific example will be described using the above-described M=3 and N=2 as an example. For example, the transmission bit string is assumed to be 10111. In this case, the allocator 110 allocates the upper 4 bits "1011" of 10111 as the basic bit string and the lower 1 bit "1" as the channel bit string.

The upper 4 bits "1011" are output to the basic signal generator 130. The lower 1 bit "1" is output to the selection signal generator 120.

The basic signal generator 130 generates a signal indicating two (=N) bit strings of the upper 2 bits "10" and the lower 2 bits "11" in the 4 bits "1011". In addition, since the channel bit string is "1", it is a combination using the first channel and the third channel, and thus the selection signal generator 120 outputs a drive signal for using the first channel and the third channel to the selector 140.

The selector 140 transmits a signal indicating the upper 2 bits "10" out of the 4 bits "1011" through the first channel and transmits a signal indicating the lower 2 bits "11" through the third channel.

The receiver 300 receives "10" through the first channel and receives "11" through the third channel. Thus, the receiver 300 acquires the bit string "1011". Further, the receiver 300 acquires "1" because the first channel and the third channel are used. Thus, the receiver 300 acquires the bit string "10111".

As described above, the signal actually transmitted is "1011", and the least significant 1 bit is obtained using information shared between the transmitter 100 and the receiver 300, which is a channel combination. On the other hand, in the known diversity reception, channel combination information is not used, and thus if a noise level after reception is the same, only the bit string of "1011" can be transmitted. Thus, according to the present embodiment, it can be seen that in a case in which the basic signal can be received with a similar error rate, more information can be transmitted than in the known diversity reception.

For example, when the transmission bit string is set as A value, N×log A+[log(C(M,N))] bits can be transmitted at most around one symbol, and transmission capacity can be increased as compared with log A bits when only one spatial channel is available.

Also, as for an allocation method of allocator 110, it is preferable to allocate the number of bits of the channel bit string determined by the allocation to be close to [log(C(M, N))] as much as possible. For example, possible allocation methods may be enumerated, the number of bits in the channel bit string generated by each allocation method may be calculated, and the obtained value close to [log(C(M, N))] may be adopted.

For example, it is assumed that N=2 is used for a multimode fiber of M=6, and each mode is expressed as modes 1, 2, . . . , and 6. An allocation method in which one basic signal 1 is selected from four modes 1 to 4 and one basic signal 2 is selected from two modes 5 to 6 is conceivable. In this case, the number of bits of the obtained channel bit string is log 4+log 2=3. On the other hand, since

[log(C(6, 2))]=3, it can be seen that the allocation method is optimal, and thus it can be seen that this allocation method may be adopted.

Figure 2:
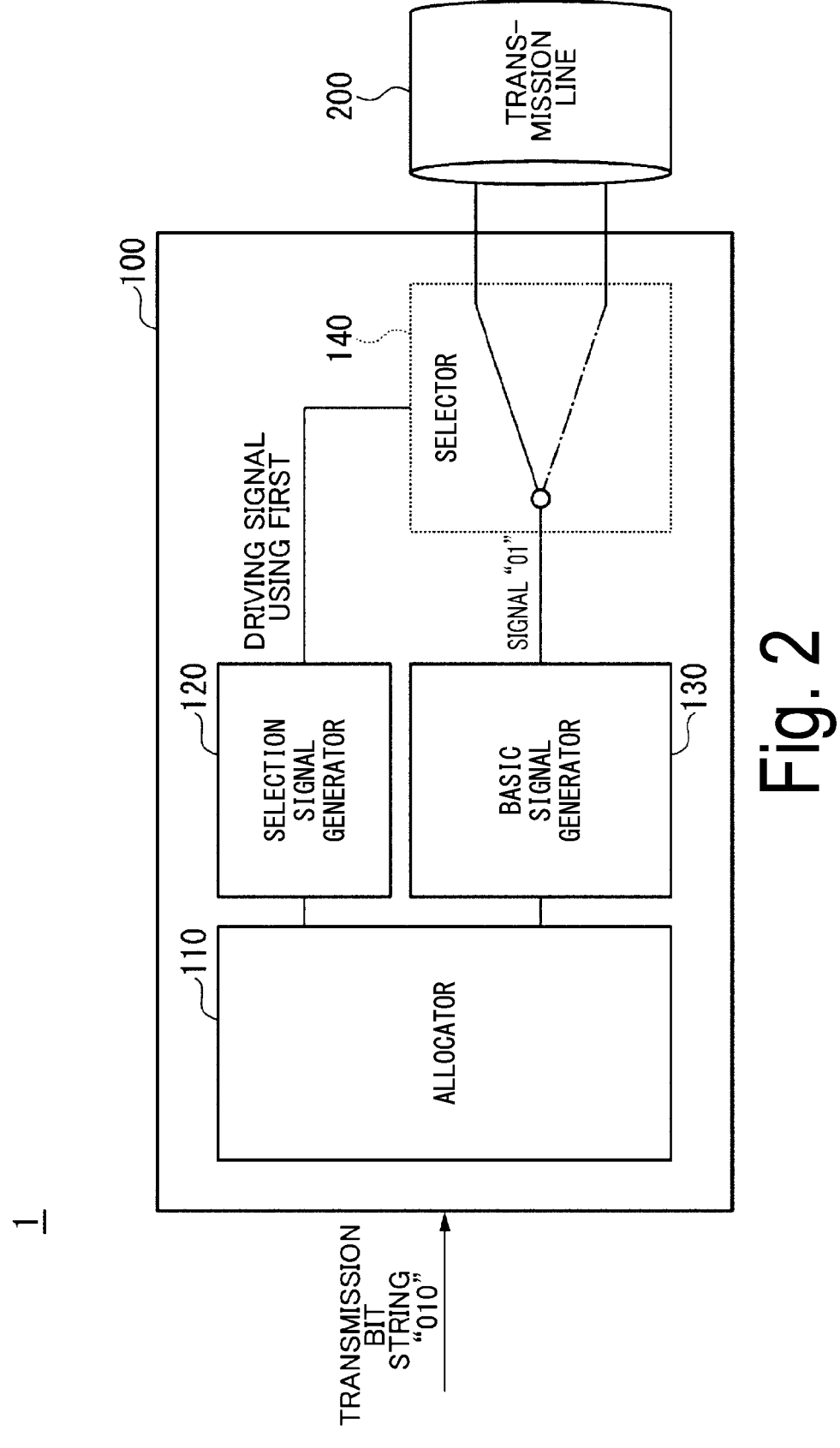
FIG. 2 is a diagram showing a configuration example in the case of N=1 and M=2.

FIG. 2 is a diagram showing a configuration example when N=1 and M=2. In FIG. 2, the receiver 300 is omitted. Since [log(C(2, 1))]=1, the number of bits of the channel bit string is 1. Then, for example, a combination using the first channel is associated with "0", and a combination using the second channel is associated with "1".

By sharing the correspondence between the transmitter 100 and the receiver 300 in advance, the receiver 300 can acquire the lower 1 bit of the received signal in accordance with the channel used. For example, as shown in FIG. 2, when the transmitter 100 transmits a signal "01" from the first channel in a case in which the transmission bit string is "010", the receiver 300 acquires "010". On the other hand, in a case in which the transmitter 100 transmits the signal "01" from the second channel, the receiver 300 acquires "011".

Figure 3:
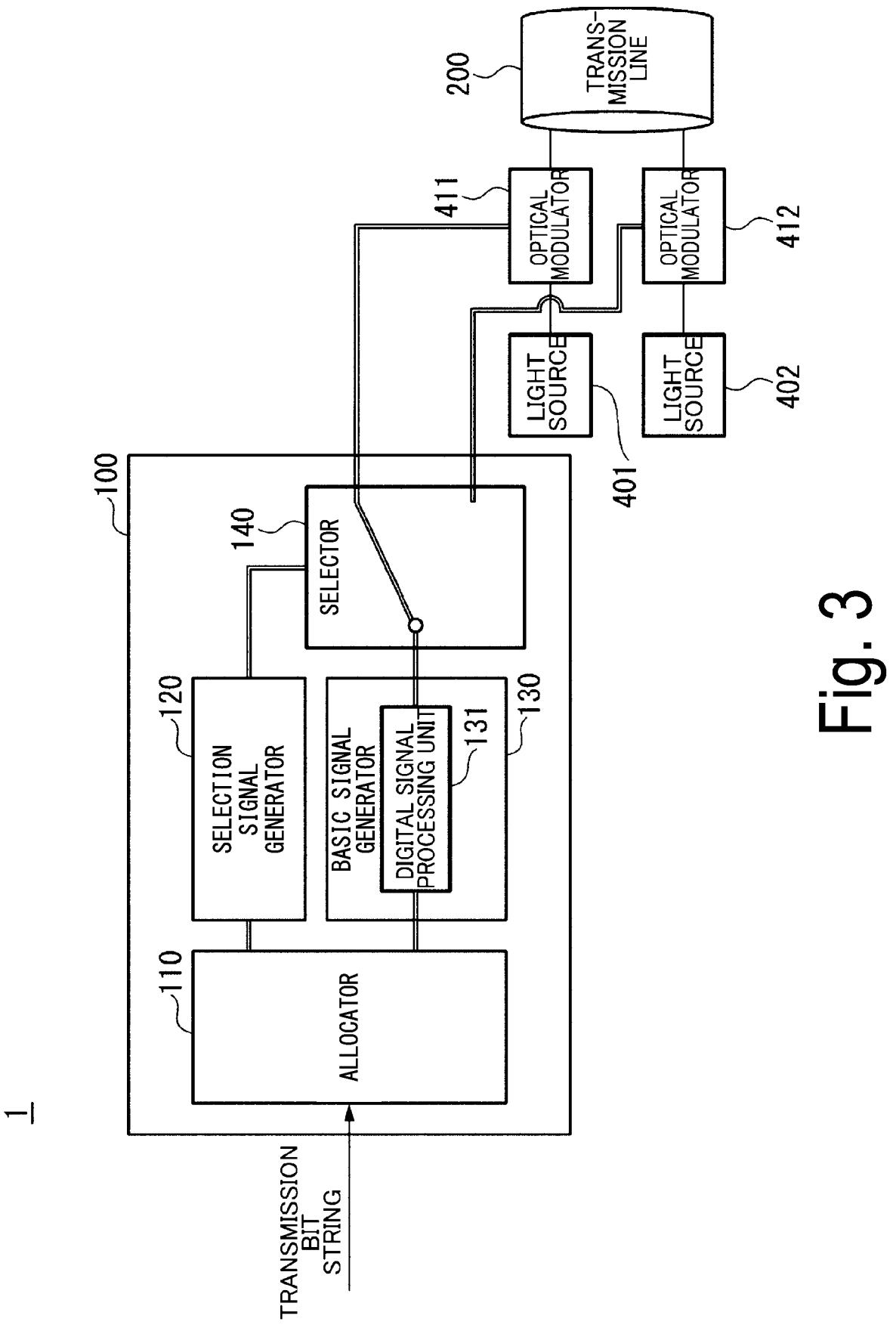
FIG. 3 is a diagram showing a configuration example in a case in which a basic signal generator outputs an electric signal to the selector.

Next, a configuration example in which the basic signal generator 130 outputs an electric signal to the selector 140 will be described. FIG. 3 is a diagram showing a configuration example in a case in which the basic signal generator 130 outputs an electric signal to the selector 140. Description of the already described reference signs in FIG. 3 will be omitted.

The configuration example shown in FIG. 3 is a configuration in which a signal is processed in an electrical domain using a dedicated electronic circuit (an electrical signal switch) before the signal is input to an optical modulator. The basic signal generator 130 includes a digital signal processing unit 131. The selector 140 is an electric signal switch. Further, light sources 401 and 402 and optical modulators 411 and 412 are provided to generate an optical signal. The light source 401 is a light source for performing modulation using the optical modulator 411. The light source 402 is a light source for performing modulation using the optical modulator 412.

An electric signal generated by the digital signal processing unit 131 is output to the first or second channel by the selector 140. In FIG. 3, the signal is output to the first channel. The electric signal output to the channel selected by the selector 140 is modulated into an optical signal by the optical modulator 411 or the optical modulator 412 and output to the transmission line 200. In FIG. 3, it is modulated into an optical signal by the optical modulator 411, and the optical signal is transmitted through the first channel.

Figure 4:
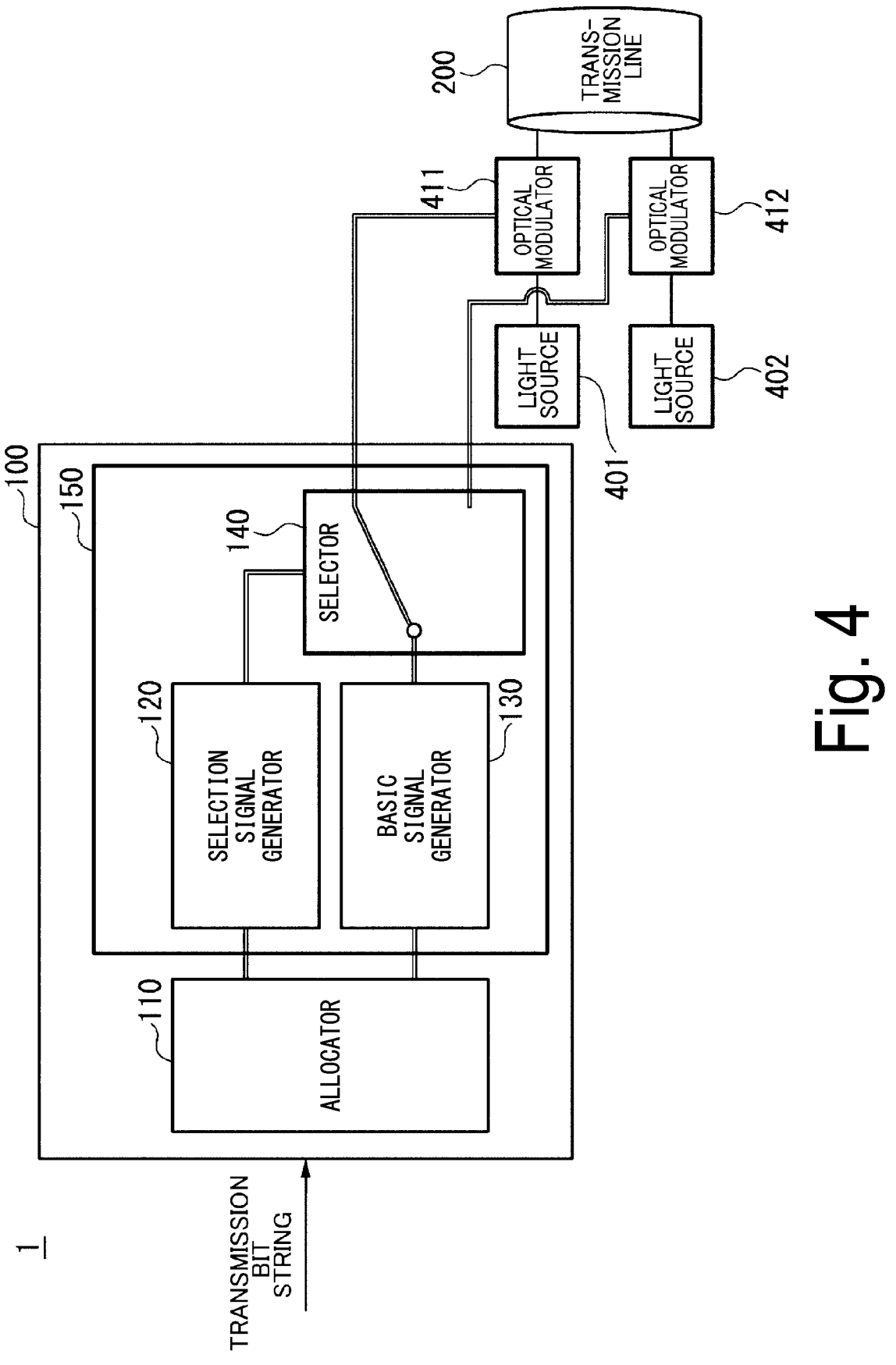
FIG. 4 is a diagram showing a configuration example using a DSP unit.

FIG. 4 is a diagram showing a configuration example using a digital signal processing (DSP) unit. Description of the already described reference signs in FIG. 4 will be omitted. The configuration shown in FIG. 4 is a configuration in which the functions of the selection signal generator 120, the basic signal generator 130, and the selector 140 are performed by a digital signal processing unit 150.

As shown in the configuration shown in FIG. 4, optical transmitters of the same number as the spatial channels to be used are prepared without using any dedicated electronic or optical circuit. Then, the digital signal processing unit may perform switching virtually on digital signal processing during encoding to generate a signal such that optical power of unused channels becomes zero.

Figure 5:
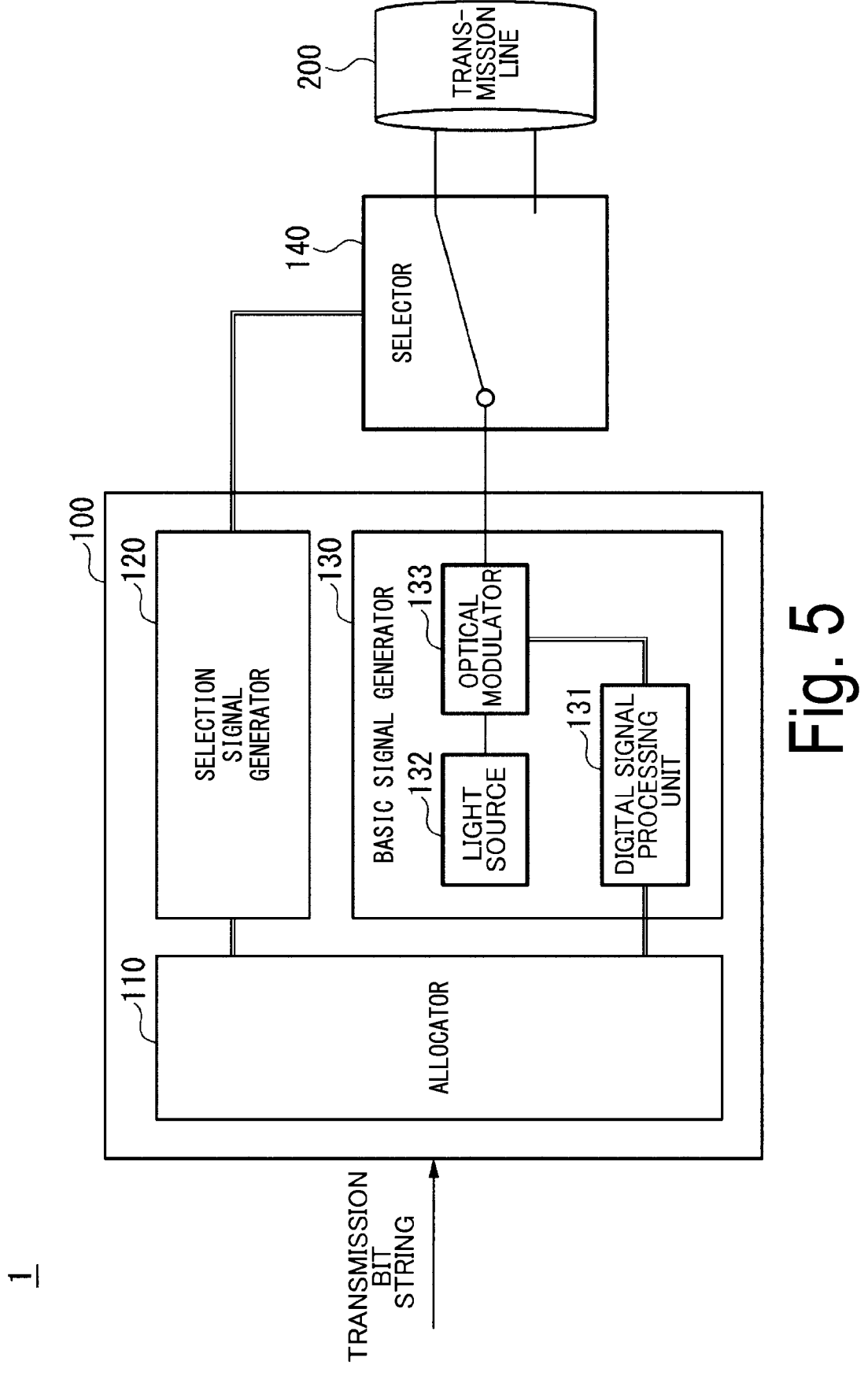
FIG. 5 is a diagram showing a configuration example in a case in which the basic signal generator modulates an electrical signal into an optical signal.

Next, a configuration example in which the basic signal generator 130 modulates an electric signal into an optical signal and outputs the optical signal to the selector 140 will be described. FIG. 5 is a diagram showing a configuration example in a case in which the basic signal generator 130 modulates an electric signal into an optical signal. Description of the already described reference signs in FIG. 5 will be omitted.

In FIG. 5, the basic signal generator 130 includes a digital signal processing unit 131, a light source 132, and an optical modulator 133. The selector 140 is an optical circuit (an optical switch). An electric signal generated by the digital signal processing unit 131 is modulated into an optical signal by the optical modulator 133 and output to the selector 140. The selector 140 outputs the input optical signal to the first or second channel. In FIG. 5, the signal is output to the first channel. The signal output by the selector 140 is output to the transmission line 200.

In the configuration shown in FIGS. 1 to 5, the transmission line 200 may include an amplification repeater configured of a fiber optical amplifier, a reconfigurable optical add/drop multiplexer (ROADM), or the like. Also, as a demodulation method performed by the receiver 300, maximum likelihood estimation or the like may be used.

According to the present embodiment described above, signal power per channel can be increased as compared with the full MIMO. In general, in long-distance optical transmission, due to noise caused by a nonlinear optical effect in a transmission path portion, there is a maximum input power which transmittable information capacity is rather reduced when optical power is bigger than that.

In the present embodiment using only the N spatial channels among the M spatial channels on the transmitting side, power per channel is reduced particularly in a multi-mode fiber or a coupled core fiber having large crosstalk between spatial channels. Thus, in consideration of inputting power up to the maximum input power of the transmission line, in the present embodiment, the signal power per channel can be ideally increased by M/N times as compared with the full MIMO. This is signal power equivalent to that of diversity transmission in which the same signal is transmitted using M/N channels.

Further, according to the present embodiment, inter-channel interference due to non-orthogonality between channels can be reduced. Specifically, a transmission signal of an i-th spatial channel is defined as $x_i$, and a reception signal of the i-th spatial channel is defined as $y_i$ (defined in a frequency domain).

The transmission signal and the reception signal are represented by vectors as follows.

$$x=[x_1,x_2,\ldots,x_M]^T$$

$$y=[y_1,y_2,\ldots,y_M]^T$$

A transfer function of a channel is defined as the following matrix H.

$$H=[h_1h_2\ldots h_M]$$

When noise generated during transmission is defined as n, a relationship therebetween can be expressed by the following formula.

$$y = Hx + n$$

The receiver 300 estimates an appropriate filter matrix $W=[w_1w_2\ldots w_M]$ and restores the transmission signal by calculating $W^H y$. Also, $W^H$ is an accompanying matrix of W. For example, in a minimum mean square error (MMSE) filter often used in spatial multiplex optical transmission, the estimated transmission signal $(x_i)\hat{}$ of the i-th channel is given by the following formula (1).

[Math. 1]

$$\hat{x}_i = (w_i \cdot h_i)x_i + \sum_{i \neq j}(w_j \cdot h_j)x_j + W^H n \qquad (1)$$

The second term on the right side in the formula (1) represents an interference portion from another channel signal. In general spatial multiplex transmission, there are a loss difference and a gain difference in relay amplification between spatial channels. For that reason, orthogonality between the channels is lost at this time, and $(w_j \cdot h_j) \neq 0$, causing inter-channel interference, and leading to a decrease in the transmission capacity. In this regard, the following literature can be referred to.

Shibahara, K., Takayuki M., and Yutaka M. (2020). "Long-Haul Mode Multiplexing Transmission Enhanced by Interference Cancellation Techniques Based on Fast MIMO Affine Projection". Journal of Lightwave Technology 38 (18), 4969-4977.

As described above, generally $(w_j \cdot h_j) \neq 0$, but there are unused channels in the present embodiment. For unused channels, $x_j=0$. Accordingly, since inter-channel interference caused by unused channels does not occur, the influence of the inter-channel interference can be reduced.

As described above, according to the present embodiment, in a case Full MIMO demodulation is impossible due to the low SNR, but the SNR is high enough to demodulate the channel selection signal, an amount of transmittable information can be increased by [log(C(M, N))] as compared to the diversity reception using the same number of signals, and thus appropriate optical transmission can be realized under a low SNR environment.

Figure 6:
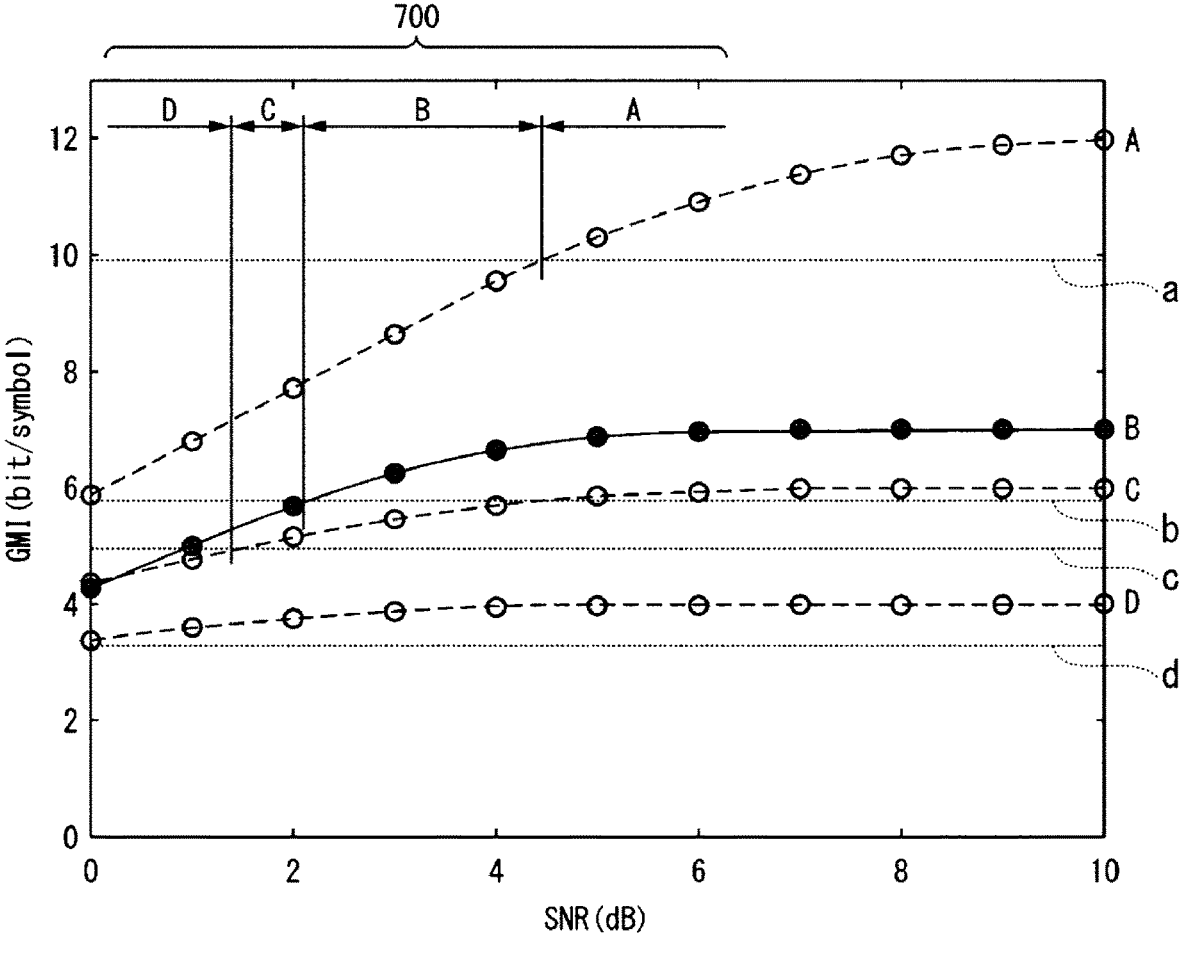
FIG. 6 is a graph showing an example of GMI evaluation.

FIG. 6 is a graph showing an evaluation example of generalized mutual information (GMI). In the graph shown in FIG. 6, the horizontal axis indicates SNR, and the vertical axis indicates GMI. In addition, the graph shown in FIG. 6 is a graph obtained by evaluating GMI by performing Monte Carlo simulation based on maximum likelihood estimation in the case of a 6-mode fiber.

Graph A shows GMI of a configuration in which 6×6 MIMO is applied to a 6-mode fiber. A broken line a indicates frequency utilization efficiency of 6×6 MIMO when a code rate is assumed to be 0.826. Graph B shows GMI of a configuration in which the present embodiment is applied to a 6-mode fiber. A broken line b indicates frequency utilization efficiency in a case in which the present embodiment is applied to a 6-mode fiber when the code rate is assumed to be 0.826. Graph C shows GMI of a configuration in which 6×3 MIMO is applied to a 6-mode fiber. A broken line c indicates frequency utilization efficiency of 6×3 MIMO when the code rate is assumed to be 0.826. Graph D shows GMI of a configuration in which 6×2 MIMO is applied to a 6-mode fiber. A broken line d indicates frequency utilization efficiency of 6×2 MIMO when the code rate is assumed to be 0.826.

A section 700 shows an optimum configuration and a section at that time. As shown in the section 700, there is a section in which the configuration to which the present embodiment is applied has the largest capacity between the sections in which the configuration to which 6×6 MIMO is applied and the configuration to which 6×3 MIMO is applied are respectively optimal.

Modified Example 1

Figure 7:
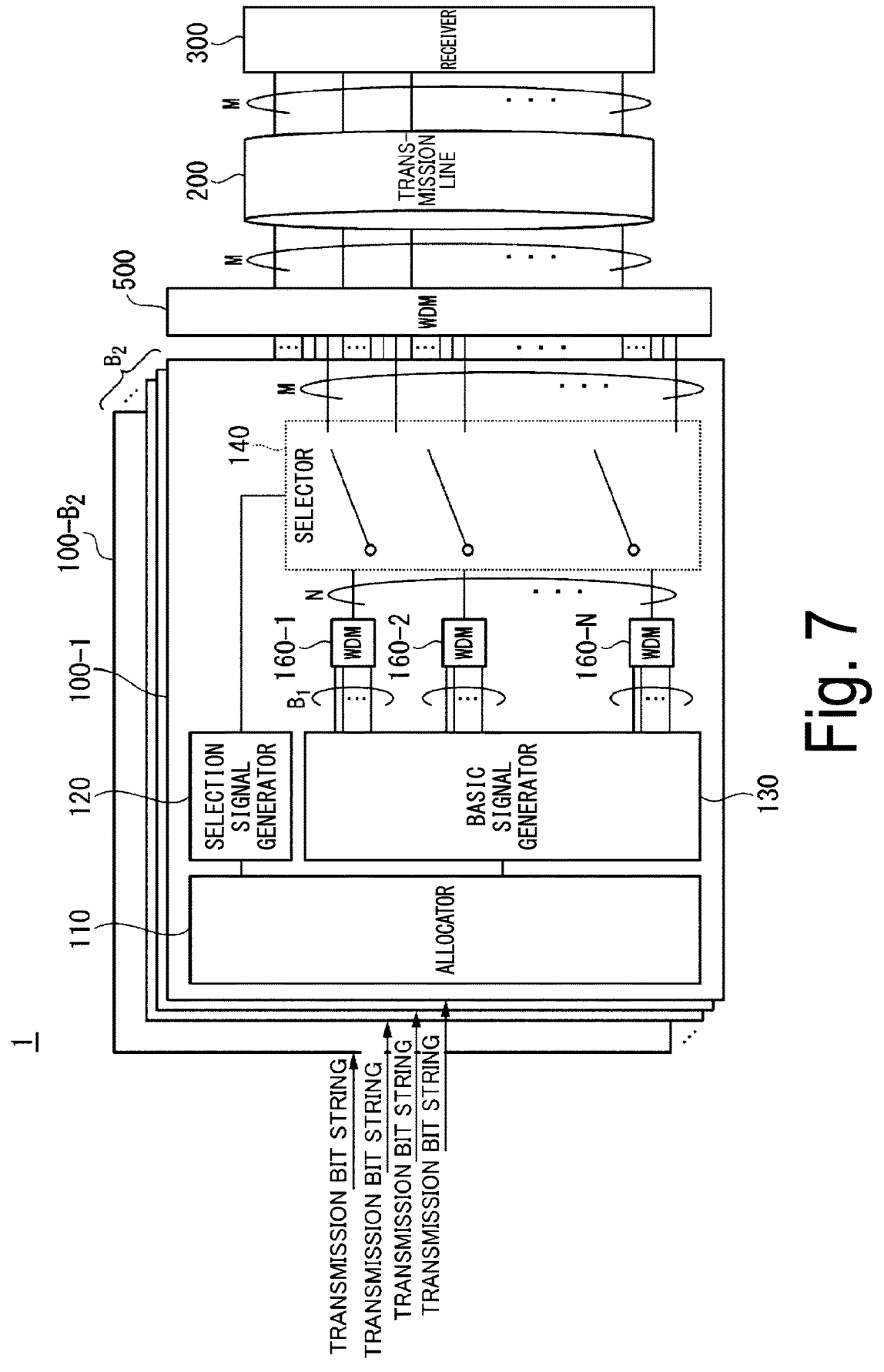
FIG. 7 is a block diagram showing a configuration of Modified Example 1.

FIG. 7 is a diagram showing a configuration example of the receiver in the case of adopting a wavelength multiplex configuration in which light beams having different wavelengths are independently modulated, multiplexed, and transmitted. First, a difference from the configuration shown in FIG. 1 is that WDMs 160-1, . . . , and 160-N are provided between the basic signal generator 130 and the selector 140. Further, the configuration is different from the configuration shown in FIG. 1 in that $B_2$ transmitters 100 themselves are provided, and WDMs 500 are provided between the transmitters 100-1, . . . , and 100-$B_2$ and the transmission line 200. In a case in which the WDMs 160-1, . . . , and 160-N are not distinguished from each other, they are simply referred to as the WDM 160. In a case in which the transmitters 100-1, . . . , and 100-$B_2$ are not distinguished from each other, they are simply referred to as the transmitter 100.

As shown in FIG. 7, the basic signal generator 130 outputs a basic signal of $B_1 \times N$ to the WDM 160. The WDM 160 wavelength-multiplexes the basic signal of $B_1$ input from the basic signal generator 130 and outputs it to the selector 140. The WDM 160 is an example of a multiplexer. The selector 140 selects N spatial channels, through which N signals generated by the basic signal generator 130 are transmitted, from M channels on the basis of the channel bit string and outputs the selected channels to the WDM 500. The WDM 500 wavelength-multiplexes signals output to the spatial channels selected by the selector 140 and outputs the multiplexed signals to the receiver 300. That is, the WDM 500 wavelength-multiplexes $B_1$ signals input from the transmitter 100 and outputs them to the transmission line 200. The WDM 500 is an example of another multiplexing.

In this way, by combining wavelength multiplexing, an amount of information per 1 time slot obtained by combining all multiplexing systems can be improved. Specifically, when the transmission bit string is set as A value in a case in which B1 wavelength channels are multiplexed before allocation to the spatial channels and B2 wavelength channels are multiplexed after the allocation, the number of bits per 1 time slot is $B2 \times (B1 \times N \times \log A + [\log(C(M, N))))$. Since the number of bits when wavelength multiplexing is not performed is $N \times \log A + [\log(C(M,N))])$, the transmission capacity can be increased by performing wavelength multiplexing as compared with the number of bits when the wavelength multiplexing is not performed. Also, the wavelength multiplexing may be performed before or after the allocation to the spatial channels. In addition, in the example shown in FIG. 7, the wavelength multiplexing is performed by both the WDM 160 and the WDM 500, but only one of them may perform the wavelength multiplexing.

Modified Example 2

Figure 8:
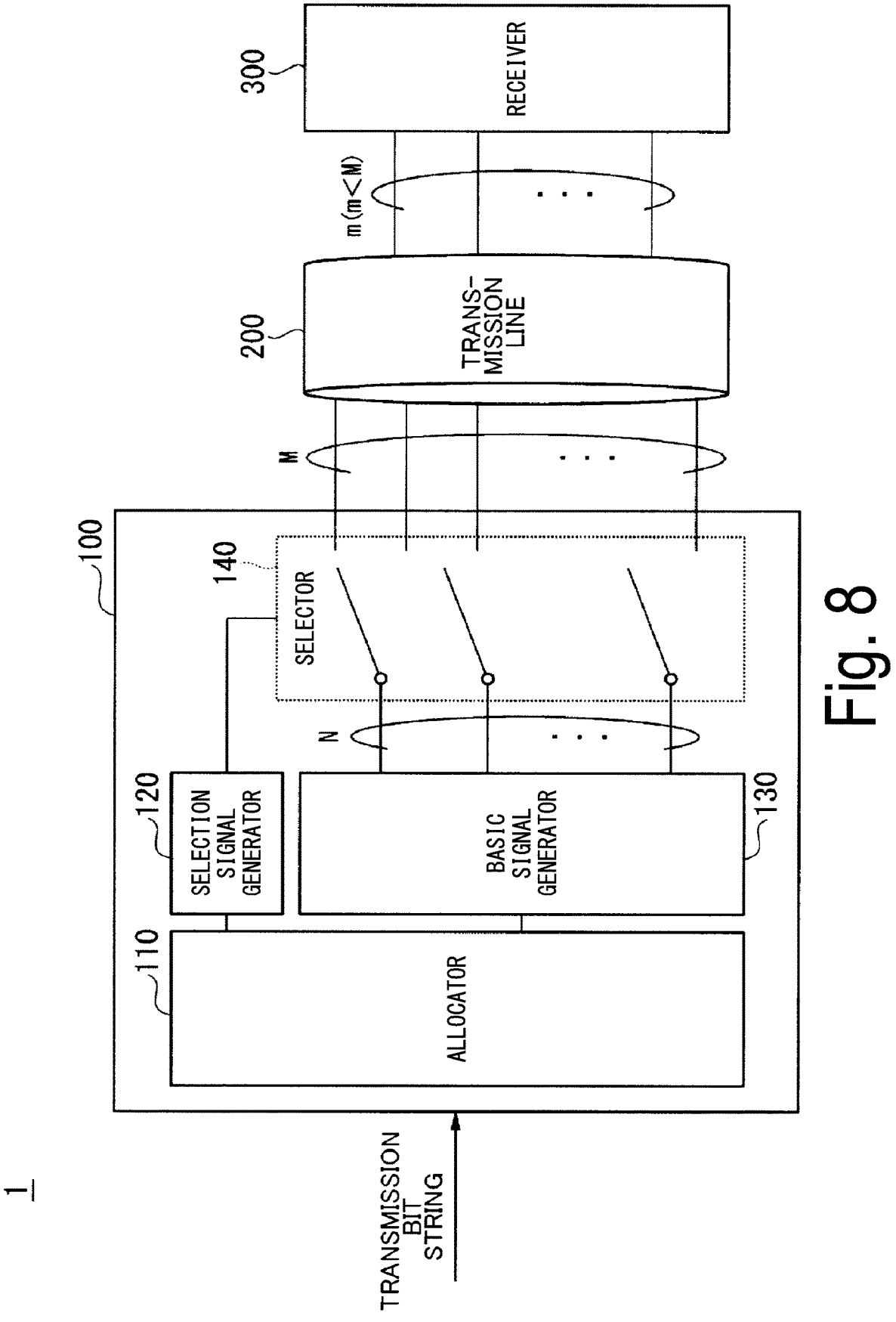
FIG. 8 is a block diagram showing a configuration of Modified Example 2.

FIG. 8 is a diagram showing a configuration example in which the total number of channels received by the receiver 300 is m (m is less than the number of spatial channels M). As shown in FIG. 8, the number of channels input to the receiver 300 is m, which is less than the number of spatial channels M. Thus, reception can be performed even if the total number of channels received by the receiver 300 is less than the number M of spatial channels.

In normal Full MIMO transmission and reception, all spatial degrees of freedom are used, and thus, in order to decode signals, it is required to receive the signals independently from all M channels. However, in the present embodiment, the channels used for transmission are some of all the channels, and the condition that a signal passing through unused channels is 0 is imposed, and thus effective degrees of freedom are smaller than those of the Full MIMO (sparsity).

As pointed out in similar studies in wireless communications, signals can also be mathematically decoded from signals even from some channels. In this regard, the following literature can be referred to.

Wen, M., Zheng, B., KIM, K. J., Di Renzo, M., Tsiftsis, T. A., Chen, K. C., & Al-Dhahir, N. (2019) A Survey on spatial modulation in emerging wireless systems: Research progresses and applications. IEEE Journal on Selected Areas in Communications, 37 ( With the configuration shown in FIG. 8, it is possible to simplify a hardware configuration and reduce power consumption by reducing a scale of calculation. Also, the receiver 300 may use regularization using a L1 norm or L0 norm, obtain an unknown signal using a convex optimization algorithm or the like, and use it to decode the signal.

The allocator 110, the selection signal generator 120, the basic signal generator 130, and the selector 140 may be configured using a processor such as a central processing unit (CPU) and a memory. In this case, the allocator 110, the selection signal generator 120, the basic signal generator 130, and the selector 140 function as the allocator 110, the selection signal generator 120, the basic signal generator 130, and the selector 140 by the processor executing a program. Also, all or some of each function of the allocator 110, the selection signal generator 120, the basic signal generator 130, and the selector 140 may be realized using hardware such as an application specific integrated circuit (ASIC), a programmable logic device (PLD), or a field programmable gate array (FPGA). The aforementioned program may be recorded on a computer-readable recording medium. The computer-readable recording medium is, for example, a portable medium such as a flexible disk, a magneto-optical disk, a ROM, a CD-ROM, or a semiconductor storage device (a solid state drive (SSD), for example), or a storage device such as a hard disk, a semiconductor storage device, or the like incorporated in a computer system. The above program may be transmitted via a telecommunication line.

Although the embodiment of the present invention has been described in detail with reference to the drawings, a specific configuration thereof is not limited to this embodiment, and also includes designs or the like within the scope of the gist of the present invention.

INDUSTRIAL APPLICABILITY

The present invention is applicable to an optical transmission system for performing transmission through an optical fiber transmission line.

REFERENCE SIGNS LIST

1 Optical transmission system
100 Transmitter
110 Allocator
120 Selection signal generator
120 Selection signal generator
130 Basic signal generator
131 Digital signal processing unit
132 Light source
133 Optical modulator
140 Selector

150 Digital signal processing unit
200 Transmission line
300 Receiver
401, 402 Light source
411, 412 Optical modulator
700 Section

The invention claimed is:

1. An optical transmission system comprising: a transmitter connected to a transmission line having M spatial channels; and a receiver that receives a signal transmitted from the transmitter via the transmission line,
wherein the transmitters includes:
an allocator that allocates a transmission bit string transmitted to the transmission line into a bit string serving as a basic signal and a bit string serving as spatial channel information;
a generator that generates N (M>N) signals from the bit string serving as the basic signal allocated by the allocator; and
a selector that selects N spatial channels, through which the N signals generated by the generator are transmitted, from the M spatial channels on the basis of the bit string serving as the spatial channel information allocated by the allocator.

2. The optical transmission system according to claim 1, wherein the receiver acquires the basic signal from signals received from the N spatial channels selected by the selector.

3. The optical transmission system according to claim 2, wherein the receiver acquires the spatial channel information corresponding to the N spatial channels from the N spatial channels that have received signals.

4. The optical transmission system according to claim 2, the optical transmission system further comprising:
a multiplexer that wavelength-multiplexes the basic signal output from the generator and outputs the wavelength-multiplexed basic signal to the selector.

5. The optical transmission system according to claim 2, wherein a plurality of transmitters are provided, and
another multiplexer that wavelength-multiplexes signals output to the spatial channels selected by the selectors of the plurality of transmitters and output the wavelength-multiplexed signals to the receiver.

6. The optical transmission system according to claim 2, wherein the receiver obtains an unknown signal from signals received from less than M spatial channels out of the M spatial channels.

7. The optical transmission system according to claim 1, wherein the receiver acquires the spatial channel information corresponding to the N spatial channels from the N spatial channels that have received signals.

8. The optical transmission system according to claim 7, the optical transmission system further comprising:
a multiplexer that wavelength-multiplexes the basic signal output from the generator and outputs the wavelength-multiplexed basic signal to the selector.

9. The optical transmission system according to claim 7, wherein a plurality of transmitters are provided, and
another multiplexer that wavelength-multiplexes signals output to the spatial channels selected by the selectors of the plurality of transmitters and output the wavelength-multiplexed signals to the receiver.

10. The optical transmission system according to claim 7, wherein the receiver obtains an unknown signal from signals received from less than M spatial channels out of the M spatial channels.

11. The optical transmission system according to claim 1, the optical transmission system further comprising:
a multiplexer that wavelength-multiplexes the basic signal output from the generator and outputs the wavelength-multiplexed basic signal to the selector.

12. The optical transmission system according to claim 11,
wherein a plurality of transmitters are provided, and
another multiplexer that wavelength-multiplexes signals output to the spatial channels selected by the selectors of the plurality of transmitters and output the wavelength-multiplexed signals to the receiver.

13. The optical transmission system according to claim 11,
wherein the receiver obtains an unknown signal from signals received from less than M spatial channels out of the M spatial channels.

14. The optical transmission system according to claim 1, wherein a plurality of transmitters are provided, and
another multiplexer that wavelength-multiplexes signals output to the spatial channels selected by the selectors of the plurality of transmitters and output the wavelength-multiplexed signals to the receiver.

15. The optical transmission system according to claim 14,
wherein the receiver obtains an unknown signal from signals received from less than M spatial channels out of the M spatial channels.

16. The optical transmission system according to claim 1, wherein the receiver obtains an unknown signal from signals received from less than M spatial channels out of the M spatial channels.

17. A transmitter connected to a transmission line having M spatial channels, the transmitter comprising:
an allocator that allocates a transmission bit string transmitted to the transmission line into a bit string serving as a basic signal and a bit string serving as spatial channel information;
a generator that generates N (M>N) signals from the bit string serving as the basic signal allocated by the allocator; and
a selector that selects N spatial channels, through which the N signals generated by the generator are transmitted, from the M spatial channels on the basis of the bit string serving as the spatial channel information allocated by the allocator.

18. A method for controlling a transmitter connected to a transmission line having M spatial channels, the method comprising:
allocating a transmission bit string transmitted to the transmission line into a bit string serving as a basic signal and a bit string serving as spatial channel information;
generating N (M>N) signals from the bit string serving as the basic signal allocated in the allocating; and
selecting N spatial channels, through which the N signals generated in the generating are transmitted, from the M spatial channels on the basis of the bit string serving as the spatial channel information allocated in the allocating.

* * * * *